(12) United States Patent
Pellar et al.

(10) Patent No.: US 7,679,782 B2
(45) Date of Patent: Mar. 16, 2010

(54) SYSTEM AND METHOD FOR EXTRACTING GRAYSCALE DATA IN ACCORDANCE WITH A PRESCRIBED TOLERANCE FUNCTION

(75) Inventors: Ronald J. Pellar, Orange, CA (US); William C. Kress, Mission Viejo, CA (US); Hiroki Umezawa, Mishima (JP)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 765 days.

(21) Appl. No.: 11/371,826

(22) Filed: Mar. 9, 2006

(65) Prior Publication Data

US 2007/0211266 A1    Sep. 13, 2007

(51) Int. Cl.
*G06F 15/00* (2006.01)
*G06K 1/00* (2006.01)
*H04N 1/60* (2006.01)

(52) U.S. Cl. .............. 358/1.9; 358/3.01; 358/3.02; 358/3.03; 358/518; 382/164; 382/167; 382/169

(58) Field of Classification Search ......... 358/1.9–3.23; 382/164, 167, 169
See application file for complete search history.

(56) References Cited

U.S. PATENT DOCUMENTS

| | | | |
|---|---|---|---|
| 5,331,440 A | 7/1994 | Kita et al. | |
| 5,363,318 A * | 11/1994 | McCauley | 702/85 |
| 5,459,590 A | 10/1995 | Bleker et al. | |
| 5,659,726 A * | 8/1997 | Sandford et al. | 707/101 |
| 5,731,989 A * | 3/1998 | Tenny et al. | 358/1.9 |
| 5,764,388 A | 6/1998 | Ueda et al. | |
| 5,764,795 A | 6/1998 | Takeo et al. | |
| 5,767,980 A * | 6/1998 | Wang et al. | 358/475 |
| 5,805,738 A * | 9/1998 | Kaburagi et al. | 382/251 |
| 5,999,703 A | 12/1999 | Schwartz et al. | |
| 6,061,501 A | 5/2000 | Decker et al. | |
| 6,081,254 A * | 6/2000 | Tanaka et al. | 382/167 |
| 6,137,596 A | 10/2000 | Decker et al. | |
| 6,172,776 B1 | 1/2001 | Murai et al. | |
| 6,281,984 B1 | 8/2001 | Decker et al. | |
| 6,313,925 B1 | 11/2001 | Decker et al. | |
| 6,681,041 B1 * | 1/2004 | Stokes et al. | 382/164 |
| 6,725,772 B2 * | 4/2004 | Martinez et al. | 101/211 |
| 6,731,400 B1 * | 5/2004 | Nakamura et al. | 358/1.9 |
| 6,739,767 B2 * | 5/2004 | Ikeda et al. | 396/567 |
| 6,831,755 B1 | 12/2004 | Narushima et al. | |
| 7,207,645 B2 * | 4/2007 | Busch et al. | 347/19 |
| 2003/0035149 A1 * | 2/2003 | Ishikawa et al. | 358/302 |
| 2003/0098986 A1 | 5/2003 | Pop | |
| 2004/0075754 A1 * | 4/2004 | Nakajima et al. | 348/231.6 |
| 2004/0114166 A1 | 6/2004 | Kubo | |
| 2004/0234135 A1 * | 11/2004 | Nomizu | 382/209 |
| 2005/0041261 A1 | 2/2005 | Narushima et al. | |

(Continued)

*Primary Examiner*—Benny Q Tieu
*Assistant Examiner*—Quyen Ngo
(74) *Attorney, Agent, or Firm*—Tucker Ellis & West LLP

(57) ABSTRACT

In accordance with the present invention, a system and method are described for producing pure gray tones on a multi-color document output device that includes a system for operating on device independent color data having multiple color components, which color data corresponds to one or more associated electronic documents. The system and method function to extract gray data by the use of tristimulus values in a range specified by a functional relationship of a selected tristimulus value.

9 Claims, 6 Drawing Sheets

U.S. PATENT DOCUMENTS

2005/0068550 A1 3/2005 Braun
2005/0264836 A1* 12/2005 Gotoh et al. ................. 358/1.9
2006/0170996 A1* 8/2006 Headley et al. .............. 358/518
2007/0263249 A1* 11/2007 Rich et al. ................. 358/1.15

* cited by examiner

| CapY | Tolerance limits $\Delta t_{xy}$ and $\Delta t_{zy}$ | |
| --- | --- | --- |
| | abs(X − Y) | abs(Z − Y) |
| 1.0000 | 0.0047 | 0.0139 |
| 0.7630 | 0.0041 | 0.0127 |
| 0.5668 | 0.0035 | 0.0111 |
| 0.4075 | 0.0029 | 0.0094 |
| 0.2812 | 0.0023 | 0.0078 |
| 0.1842 | 0.0018 | 0.0062 |
| 0.1125 | 0.0014 | 0.0048 |
| 0.0624 | 0.0011 | 0.0035 |
| 0.0299 | 0.0008 | 0.0025 |
| 0.0113 | 0.0005 | 0.0012 |
| 0.0000 | 0.0001 | 0.0003 |

*Figure 4(a)*

SYSTEM AND METHOD FOR EXTRACTING GRAYSCALE DATA IN ACCORDANCE WITH A PRESCRIBED TOLERANCE FUNCTION

BACKGROUND OF THE INVENTION

The application pertains generally to the art of color image rendering, and more particularly to image rendering which extracts true or pure gray values, that is near neutral levels, from a color image represented in a multi-dimensional color coordinate scheme. It will be appreciated that the subject application is particularly advantageous in generating renderings of electronic documents, and will be described with particular reference thereto. However, it will be appreciated that the subject system is applicable to any image rendering operation which would benefit by extraction of color information for generation of multi-bit halftone images that correspond to both a pallet of an image file and to rendering capabilities of a document processing device.

Earlier color image rendering systems frequently employ images that are described numerically relative to primary color components. Such color components are suitably additive in nature, such as red-green-blue (RGB), or subtractive, such as cyan, yellow, magenta (CYM), the latter of which is frequently coupled with a black color (K), referred to as CYMK or CYM(K). Many images rendered from such color descriptions include image portions which are gray. Gray objects that are rendered with multiple colors will typically lose edge definition and might have mis-registration artifacts, such as rainbowing. It is recognized that extraction of such gray information for rendering with a single color, such as black, can improve image quality and increase integrity of aspects such as edge generation. Furthermore, it is frequently less expensive and more expeditious to use a single, black color generator to render a gray, rather than multiple blends of color which require additional processing and added ink or toner use. While the preferred embodiment herein corresponds to gray extraction and rendering, it will be appreciated that the concepts disclosed herein are applicable to extraction and rendering of any image component that corresponds to a rendering capability of an associated document processing device.

There are three basic ways that a gray is typically produced on a printer, such as using all four colors on a four color printer, by way of example. A first method employs a composite coloration scheme employing a balance of primaries, such as cyan, magenta and yellow colorants. A second method employs multi-color composites. By way of example, this is suitably comprised of cyan, magenta, yellow and black. A third option is to form a gray coloration solely by use of a single color, typically black. While a four color gray generation approach may provide darker, richer gray values, this is often at a cost of sharpness in edges and lines due to a large amount of toner needed in the overlaying of the four colors. In a typical system that employs the alternative, black color gray generation, a better edge definition is realized in edges and lines, but at a sacrifice of a production of as dark or rich a gray value. A particular choice as to which technique to use to render grays is frequently dependent on a selected object that is to be rendered, such as text, image, graphic stroke, graphic fill, and the like. Further, practical considerations, such as cost and speed, may govern which method is to be employed for generation of a gray level output.

The concepts disclosed herein are better appreciated with an understanding of numeric models used to represent images, and image colorization, in image processing or rendering applications. CIE L*a*b* (CIELAB or Lab) is frequently thought of one of the most complete color models. It is used conventionally to describe all the colors visible to the human eye. It was developed for this specific purpose by the International Commission on Illumination (Commission Internationale d'Eclairage, resulting in the acronym CIE). The three parameters (L, a, b) in the model represent the luminance of the color (L, by example, a low value, such as L=10 indicates a yields black and a high value such as L=95 indicates a white), its position between red and green (a, negative values indicate green, while positive values indicate red) and its position between yellow and blue (b, negative values indicate blue and positive values indicate yellow). Under the model, a maximum white occurs when illuminant is L*=100. Typically, the whitest possible paper is around 95 or 96. A value of L*=0 is absolute black, which value is generally not obtainable, except in an absolutely dark room or "black hole". A more typically realized black is at an L* value in the range of 5-20.

The Lab color model has been created to serve as a device independent reference model. It is therefore important to realize that visual representations of the full gamut of colors in this model are not perfectly accurate, but are used to conceptualize a color space. Since the Lab model is three dimensional, it is represented properly in a three dimensional space. A useful feature of the model is that the first parameter is extremely intuitive: changing its value is like changing the brightness setting in a TV set. Therefore only a few representations of some horizontal "slices" in the model are enough to conceptually visualize the whole gamut, wherein the luminance is suitably represented on a vertical axis.

The Lab model is inherently parameterized correctly. Accordingly, no specific color spaces based on this model are required. CIE 1976 L*a*b* mode is based directly on the CIE 1931 XYZ color space, which sought to define perceptibility of color differences. Circular representations in Lab space corresponded to ellipses in XYZ space. Non-linear relations for L*, a*, and b* are related to a cube root, and are intended to correlate well with the response of the eye. Coloring information is referred to the color of the white point of the system.

One of the first mathematically defined color spaces was the CIE XYZ color space (also known as CIE 1931 color space), created by CIE in 1931. A human eye has receptors for short (S), middle (M), and long (L) wavelengths, also known as blue, green, and red receptors. One need only generate three parameters to describe a color sensation. A specific method for associating three numbers (or tristimulus values) with each color is called a color space, of which the CIE XYZ color space is one of many such spaces. The CIE XYZ color space is based on direct measurements of the human eye, and serves as the basis from which many other color spaces are defined.

In the CIE XYZ color space, tristimulus values are not the S, M and L stimuli of the human eye, but rather a set of tristimulus values called X, Y, and Z, which are also roughly red, green and blue, respectively. Two light sources may be made up of different mixtures of various colors, and yet have the same color (metamerism). If two light sources have the same apparent color, then they will have the same tristimulus values irrespective of what mixture of light was used to produce them.

It would be advantageous to have a system that works on a defined color space, such as the XYZ color space, and extracts gray information for rendering on a single color, such as black, referred to herein as a "true gray" rendering.

SUMMARY OF THE INVENTION

In accordance with the present invention, a system and method are described for producing single color or pure gray tones on a multi-color document output device that includes a system for operating on device independent color data having at least three color components, which color data corresponds to one or more associated electronic documents. The system and method function to extract gray data from such a device independent color data description in accordance with tolerance values associated with a selected component value. Such resultant data, inclusive of a color data portion rendering and a gray portion rendering, is thus completed in device independent form.

In accordance with a more limited aspect of the present invention, there is taught a system and method for producing single color or pure gray tones by calculating a function of values of the at least three color components falling within a tolerance range that is either calculated as a function of a single tristimulus value or pre-stored in a lookup table.

In accordance with a more limited aspect of the present invention, there is taught a system and method for producing gray tones which includes conversion of modified device independent data to that associated with the specified color space corresponding to at least one document processing device.

An advantage of the present invention is the provision of a system by which true gray image aspects may be extracted from an image described in multi-dimension color space.

Another advantage of the present invention is the teaching of a system which accomplishes extraction of true gray color aspects in device independent space.

Yet another advantage is the provision of an image rendering system which provides extraction of true gray color aspects with improved image characteristics.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain figures, including:

FIGS. 4(a) and 4(b) illustrate functional relationships and discrete values, respectively, associated with tolerance values used in gray extraction employed by the subject invention.

DETAILED DESCRIPTION OF THE PREFERRED EMBODIMENT

Figure 1:
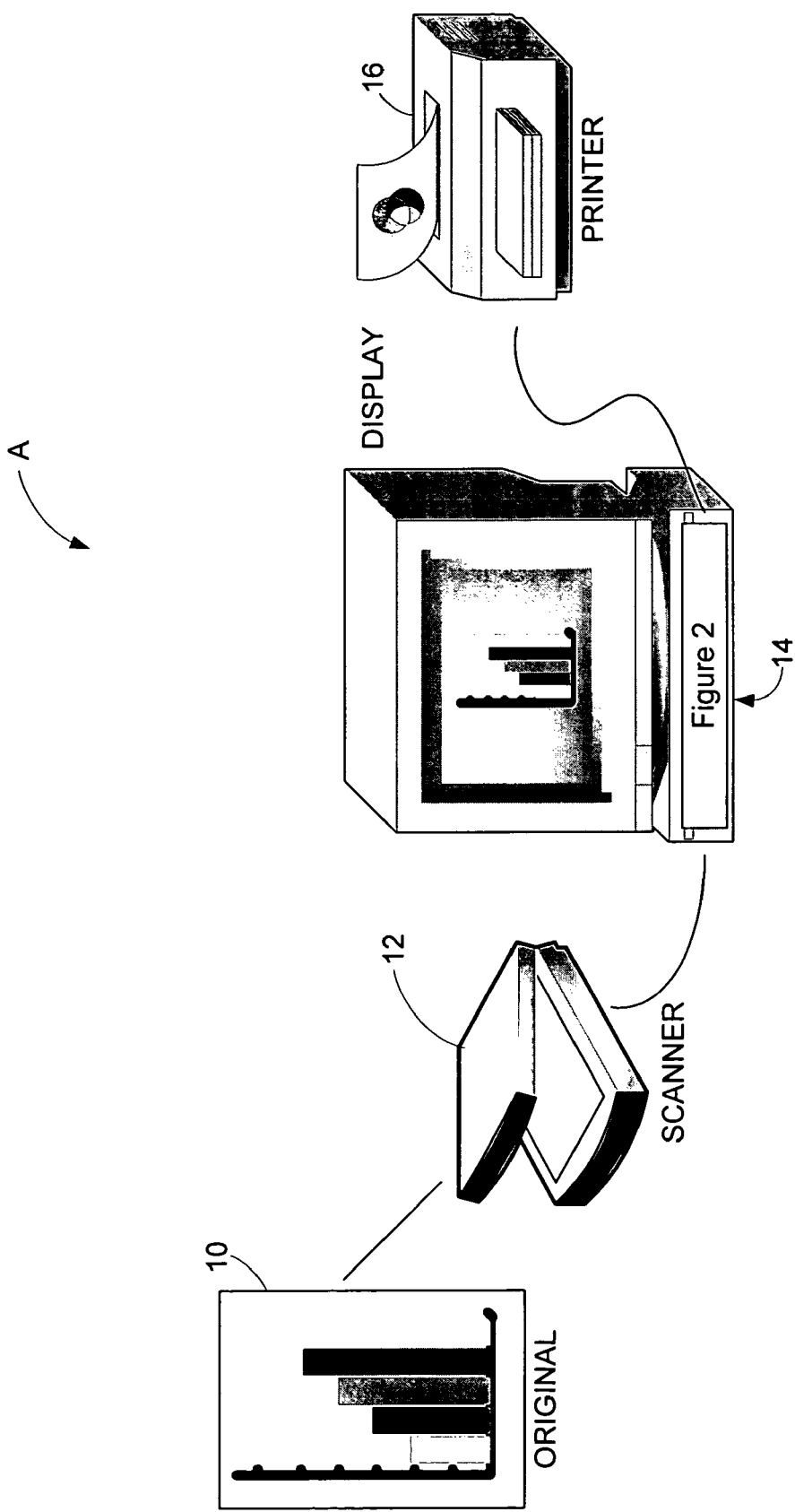
FIG. 1 which is an overall system diagram of a gray extraction and rendering system in connection with the subject invention.

Turning now to the drawings wherein the showings are for purposes illustrated in the preferred embodiment only, and not for the purpose of limiting the same. FIG. 1 illustrates an overall system diagram for the gray scale extraction as contemplated herein.

In FIG. 1, color rendering system A illustrates an electronic document processing system employing extraction of gray information in accordance with the subject invention. An electronic document is received at 10, which document is suitably obtained from an application, such a word processing application, image editing application, drawing application, image creation application, etc. Input is suitably in any format, by way of example including portable document format (PDF), *.doc, TIFF, JPG, etc. A received electronic document is communicated to a gray extraction system 12, the details of which will be described below. Once processed, data is communicated to a document renderer 14 for generation of a bitmapped image. Once completed, an output is suitably generated to allow a user to view the resultant document. Such output is suitably by a visual display terminal, or transitioned into a hard copy output, suitably obtained from a printer, such as a color laser printer, inkjet printer, etc.

Single color gray scale generation, or black-only neutral coloration, allows for lessened toner pile height, and results in a rendering or generation of text or graphic images that appear sharper and smoother. Additionally, renderings benefit from a reduction of mis-registration artifacts on neutral text and graphic stroke objects.

Image data from which gray scale information has been extracted is suitably communicated to a suitable color output device, such as laser printer, inkjet printer, dot matrix printer, and the like. Although the illustration is made in connection with an input as a scanning device and an output as printer, it is to be appreciated that a suitable digital image will be realized from any suitable input device, such as a digital camera, applications such as a drawing package, or receipt via input from an e-mail or storage device. Conversely, a suitable output can be a plotter, storage, transmission, and the like as will be appreciated by one of ordinary skill in the art.

Figure 2:
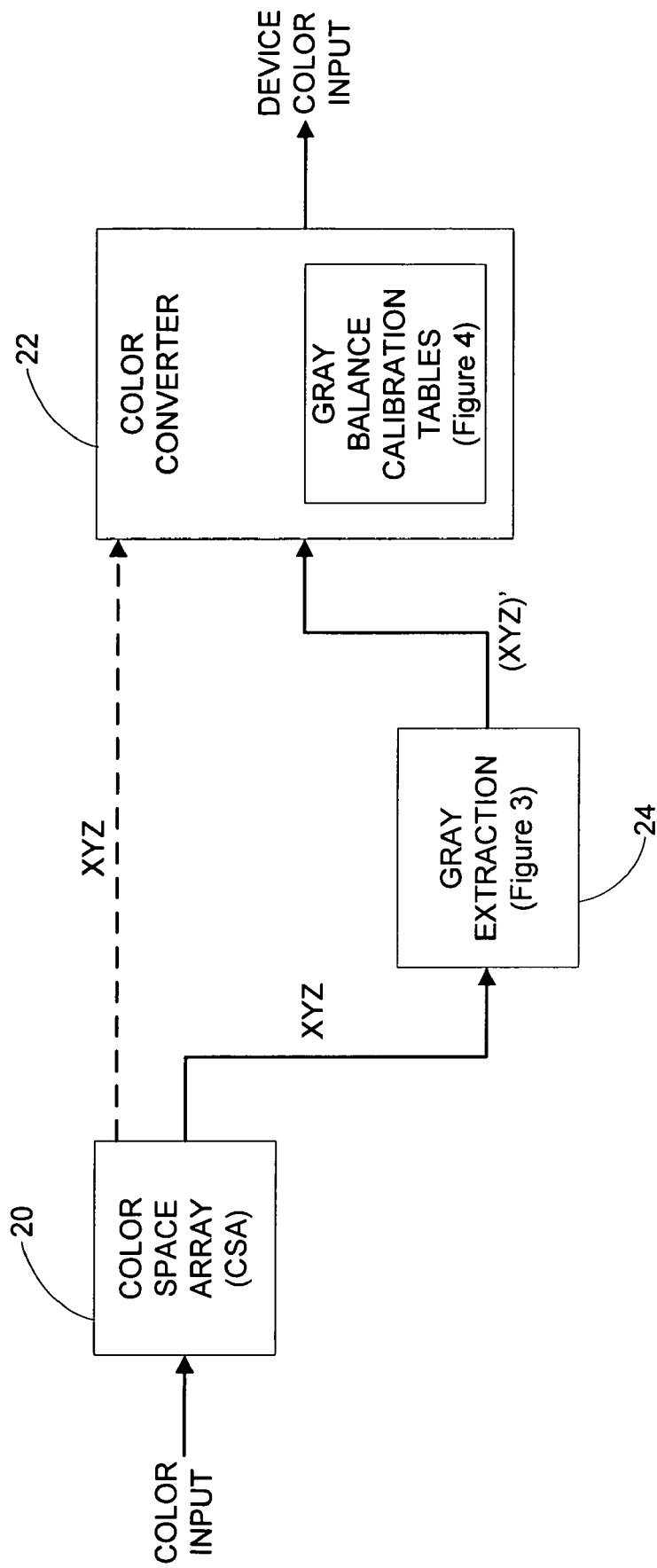
FIG. 2 is a flow diagram relative to gray extraction employed in the subject invention.

Turning now to FIG. 2, illustrated is a block diagram showing conversion suitably completed at the computer system 14 of FIG. 1. In FIG. 2, color input, such as that illustrated by the electronic document input 10 of FIG. 1, is communicated to a color space array 20. In a typical conversion, a color-rendering path, such as used in an image path of the PostScript specification, data from the color space array is communicated directly to a color converter 22. In the example of a PostScript conversion, a color conversion in color converter 22 is typically accomplished with a color rendering dictionary.

The subject system accomplishes determination of gray state from numeric color representation information. As will be appreciated from the description below, this separation is suitably accomplished at the color input level, at an intermediate level between the color space array and the color converter, or at the device color output level. For the reasons detailed below, it is particularly advantageous to extract gray information at the intermediate level, and via gray extraction system 24, as illustrated in FIG. 2.

Document imaging devices which are able to generate tonal values corresponding to more than one level are advantageously used such that a threshold value of an array is used completely between available output levels. In the subject system, a lower output of two possible values is chosen in the event an image input value is less than a selected threshold value. If an image value is greater than or equal to the threshold, a value which is higher of two output values is advantageously generated.

In determining a gray for particular color components, a determination is suitably made depending upon the location in a color conversion pipeline that a test determination is to be made. In an arbitrary three color system, components of which are suitably referred to as $C_1$, $C_2$ and $C_3$. A gray level is assumed to exist at a point where all components are assumed to be equal. However in this instance, a resultant gradation of gray level utilizing variations between the color components does not always hold true. This is particularly true for colors based on the CIE system described above. The subject invention is made in connection with the CIE color space. However, it is to be appreciated that any suitable color space, such as the International Color Consortium (ICC) space, Windows Color System (WCS) space, and the like, which is operable in a device independent profile connection space is suitable.

In a CIE color specification, the color space is typically converted by means of a color space array 20 into intermediate values, such as X, Y and Z values, such as illustrated in FIG. 2. Once so converted, it is then converted to a device specific output format such as red, green, blue (RGB); cyan, yellow and magenta, (CYM) or CYM with a black component, CYMK. This is suitably completed via a color rendering dictionary which forms a typical conversion mechanism employed in the art. This output, in turn, forms device color input to a rendering device as illustrated in FIG. 1. As noted above, it is to be appreciated that a determination of a suitable gray value is suitably performed at an input stage, prior to color space array 20, at an intermediate or XYZ stage as illustrated in FIG. 2 at gray extraction 24, or an output stage which is converted to a device dependent format after output of the color converter 22.

Considering the conversion option taken at the input stage, colors are suitably specified in a CIE based color space with a RGB type. Such gray levels are generally given by a condition wherein R=G=B, provided that input values have not been generated by a high precision calculation. In the event that image input is from a scanning device, or generated by a relatively low precision calculation, a definition of a gray color is not so easily defined. In some cases, a CIE color specification is made in a luminance-chrominance such as YCC (luminance Y, red chrominance $C_r$, blue chrominance, $C_b$), CIE L*u*v* (designed for emissive colors and to be perceptually uniform), CIE L*a*b, noted above, and the like. Therein, a gray criteria will resemble a format such as $C_2=C_3=0$ in order to define a gray having a value determined by the $C_1$ component. Other than in situations wherein an input CIE color space is predetermined or is limited to known spaces, a gray determination at an input color value is generally not practical for a general case.

In accordance with the foregoing, the subject invention teaches a conversion and extraction of a true gray value at an intermediate XYZ stage as illustrated in the preferred embodiment of FIG. 2. Conversion herein is advantageously chosen to occur in the XYZ space, (and not the more customary LAB space) insofar as: (1) it is an available parameter from the device independent image path, and (2) it avoids expensive processor overhead (clock cycles) required in a calculation of LAB values from those of XYZ space. The reason it is an available parameter is that the PostScript CSA emits tristimulus XYZ values. Therefore, the algorithm uses XYZ directly.

In a typical application, an intermediate stage is formed between a color space array and color rendering dictionary, as used as a color converter by an Adobe Systems PostScript rendering mechanism as will be appreciated by one of ordinary skill in the art. As noted above, it is to be appreciated that such conversions are suitably employed, such as International Color Consortium (ICC) conversion, Microsoft Windows Coloring System (WCS), or any system employing a color system path wherein an operation is suitably accomplished in a profile connection space (PCS).

Typically, a larger tolerance value is required insofar as an output of a multi-dimensional look-up table will not have precision to determine gray colors with sufficient accuracy. In the event that the color converter 22 incorporates a color-rendering dictionary that been constructed to include linearization and gray balance, that is, constructed from direct measurement data with linear transfer functions, then gray determination is not typically feasible at a color rendering dictionary output. This is attributed to the fact that equal amounts of toner or ink will not produce neutral gray and proportions of toner required to yield a gray are difficult to ascertain in advance for any particular printer.

A suitable color converter incorporates a color rendering dictionary to facilitate conversion from an XYZ space to a color palette associated with an associated output device. As noted above, the subject invention teaches gray extraction at this intermediate level, and is therefore accomplished between the color space array 20 and color converter 22. This extraction is completed at gray extraction mechanism 24, which receives multi-dimensional color information, such as XYZ. A modified multi-dimensional description, with gray scale information extracted therefrom, is defined as (XYZ). This modified value is communicated to a color converter 22 for conversion to a format associated with a selective output device.

Figure 3A:
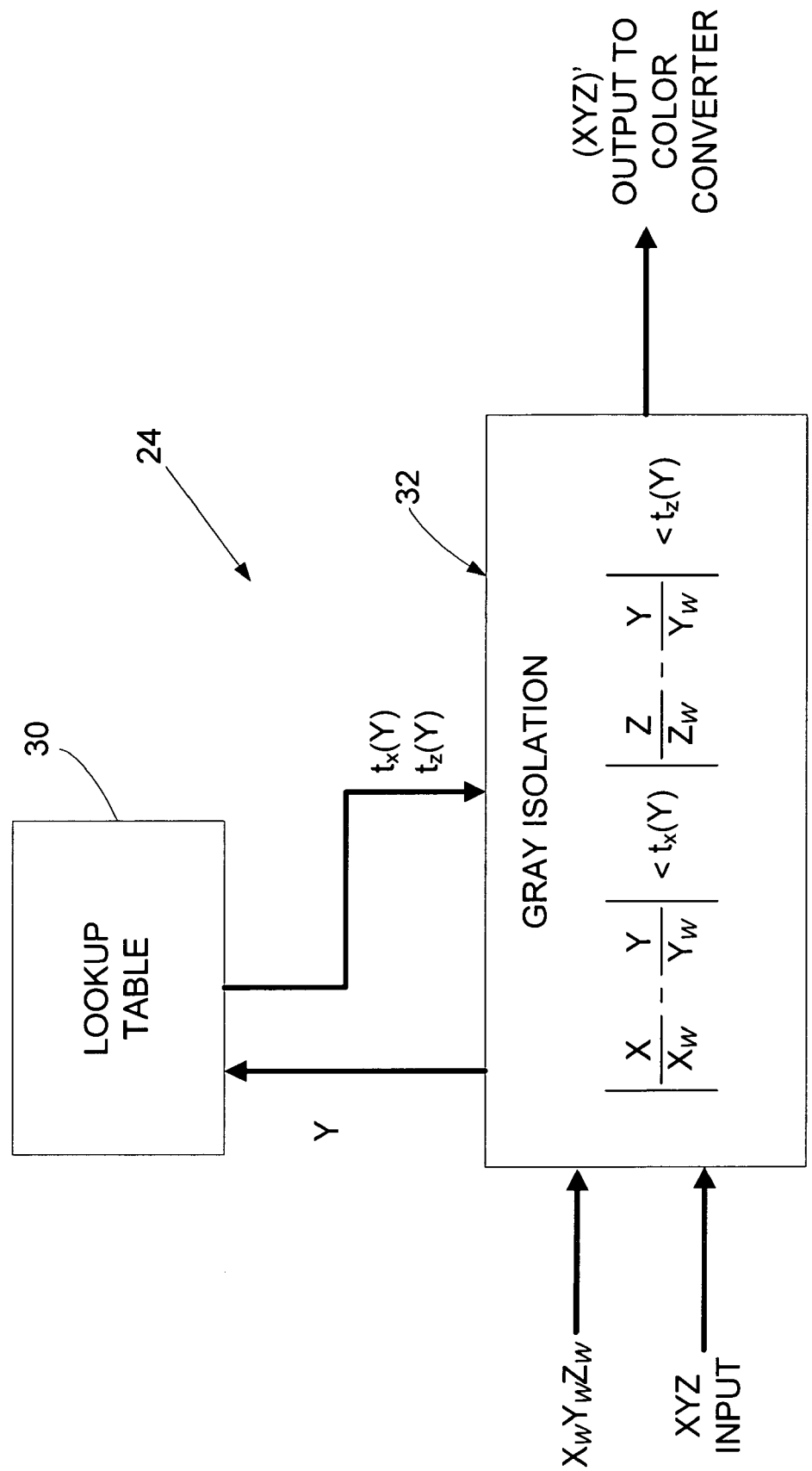
FIGS. 3(a) and 3(b) illustrate alternative embodiments of obtaining tolerance values, using a lookup table and calculated values, respectively, employed by the subject invention.
Figure 3B:
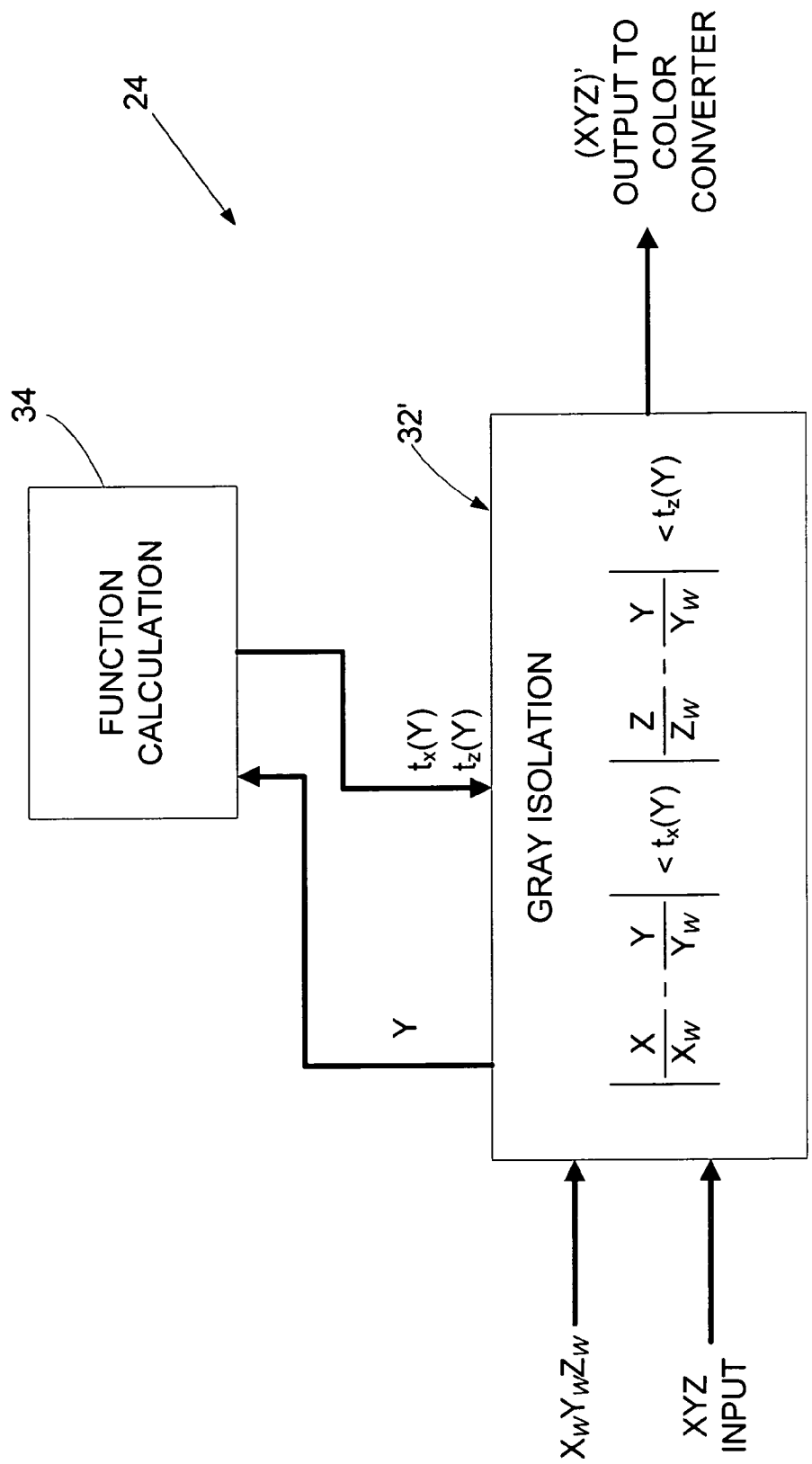

Turning to FIG. 3, alternative embodiments of a suitable gray extraction mechanism 24 is provided in greater detail in FIGS. 3(a) and 3(b). Gray isolation, as noted above, is completed at an intermediate stage between a color space array and a color converter, such as a color rendering dictionary in connection with a postscript embodiment.

In the embodiment of FIG. 3(a), XYZ input is received into the gray isolation system, as noted above, along with source illuminant values $X_w$, $Y_w$ and $Z_w$. All ICC profiles and color space arrays provide a definition of the white point as a (required) parameter. Therefore, $X_w$, $Y_w$ and $Z_w$ values are provided by this means. For the case of ICC profiles, the white point is set at a D50 illuminant value. For a PostScript color space array, its value is unspecified. The value is provided as a parameter. A selected tristimulus value, in the preferred embodiment tristimulus value Y, is communicated to a lookup table 30, which lookup table returns tolerance values $t_x(Y)$ and $t_z(Y)$ which have been pre-stored therein and correspond to the received Y value. Suitable tolerance values will be described in more detail, below.

Tolerance values from lookup table 30, along with the received XYZ input, are communicated to a gray determination calculation means 32 for gray level extraction in accordance with the inputs in accordance with the function:

$$|(X/X_w - Y/Y_w)| < t_x(Y); \text{ and}$$

$$|(Z/Z_w - Y/Y_w)| < t_z(Y).$$

In the forgoing, both parameters must be satisfied in the preferred embodiment in order to ascertain that any associated pixel is in an extractable, or true, gray level within the prescribed tolerance.

It is to be appreciated that $t_x$ and $t_z$ represent tolerances that allow an area around absolute gray to be defined as true gray. That is, while absolute gray is defined as $a^*=b^*=0.0$, true gray may have an $a^*=2$ and $b^*=2$. This is variable. An input to the process of determining the function (lookup table determined using a computer program) is the $a^*b^*$ tolerance within which the pixel is defined as true gray.

It will be noted that ordering of the differences $|X/X_w-Y/Y_w|$ or $|Z/Z_w-Y/Y_w|$ is inconsequential insofar as the absolute value thereof is unchanged. A calculated value $(XYZ)'$ thereby includes extracted gray information within the tolerance range, and forms an output to color converter 22 (FIG. 2). It will be appreciated that the differences are both made with respect to $Y/Y_w$. Thus, the tolerance values are advantageously calculated with respect to the tristimulus Y value. It is also contemplated that other relationships, such as $|X/X_w-Z/Z_w|$ are also suitably used when coupled with a corresponding tolerance function.

FIG. 3(b) illustrates an alternative embodiment wherein the lookup table 30 of FIG. 3(a) is replaced with a functional calculator or calculation means 34. This serves to calculate tolerance values $(Z/Z_w-Y/Y_w)$ in accordance with a selected functional relationship corresponding to a component input, such as that Y in the preferred embodiment. Functionality of gray isolation calculation is completed with means 32' as noted in connection with FIG. 3(a), above, which values are suitably calculated or obtained by use of a look-up table, the later of which typically bears a speed advantage due to elimination of processor overhead required for calculation.

Figure 4B:
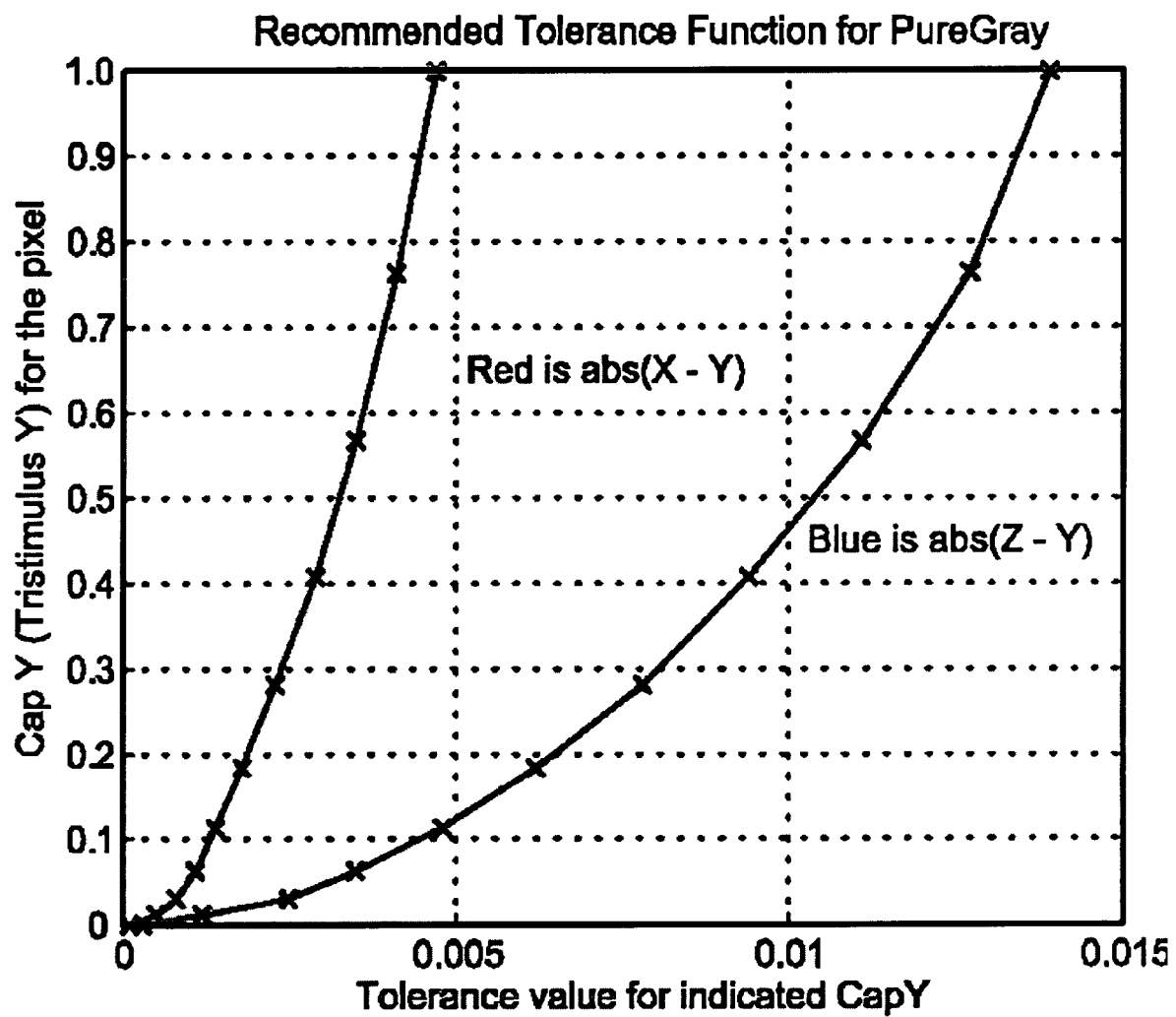

FIG. 4 illustrated in greater detail obtaining of the tolerance values noted in connection with FIG. 3, above. It will be appreciated that tolerance functions are calculated relative to near neutrality in XYZ space. FIG. 4(a) illustrates suitable values used an interpolation scheme to derive the values in FIG. 4(b), which figure shows suitable lookup table values.

It will be appreciated from the forgoing that the subject application teaches a system by which extractable grays information is advantageously isolated from a multi-color representation. This affords an image rendering which has increased edge definition, and is more efficiently rendered than systems in which all available colors are utilized for gray color representation.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for gray extraction in a multicolor document output device comprising:
   means adapted for receiving substantially non-linear, device independent color data having at least three color components, corresponding to an associated electronic document;
   means adapted for calculating a first difference value between a first color component of the at least three color components and a second color component of the at least three color components;
   means adapted for calculating a second difference value between the first color component of the at least three color components and a third color component of the at least three color components;
   means adapted for receiving first tolerance data values representative of a selected range of the device independent color data corresponding to gray coloration associated with the calculated first difference value;
   means adapted for receiving second tolerance data values representative of a selected range of the device independent color data corresponding to gray coloration associated with the calculated second difference value; and
   gray conversion means adapted for generating single color gray data from the color data in accordance with the first and second difference values and the first and second tolerance data values;
   wherein the first color component is represented by a tristimulus value Y, the second color component is represented by a tristimulus value X, the third color component is represented by a tristimulus value Z, and wherein the gray conversion means includes means adapted for generating the single color gray data in a selected range defined by:

$|(X/X_W - Y/Y_W)| < t_X(Y)$; and $|(Z/Z_W - Y/Y_W)| < t_Z(Y)$; wherein $t_X(Y)$ and $t_Z(Y)$ define the first and second tolerance data values corresponding to a value of the first color component.

2. The system for gray extraction of claim 1 further comprising tolerance calculation means adapted to calculate the first and second tolerance data values as functionally related to the first color component.

3. The system for gray extraction of claim 1 further comprising a lookup table, the lookup table including means adapted for outputting selected first and second tolerance data values corresponding to a value of the first color component.

4. A method for gray extraction on a multicolor document output device comprising the steps of:
   receiving substantially non-linear, device independent color data having at least three color components, corresponding to an associated electronic document;
   calculating a first difference value between a first color component of the at least three color components and a second color component of the at least three color components;

calculating a second difference value between the first color component of the at least three color components and a third color component of the at least three color components;

receiving first tolerance data values representative of a selected range of the device independent color data corresponding to gray coloration associated with the calculated first difference value;

receiving second tolerance data values representative of a selected range of the device independent color data corresponding to gray coloration associated with the calculated second difference value; and generating single color gray data from the color data in accordance with the first and second difference values and the first and second tolerance data values wherein the first color component is represented by a tristimulus value Y, the second color component is represented by a tristimulus value X, the third color component is represented by a tristimulus value Z, and wherein the step of generating single gray data includes the step of generating the single color gray data in a selected range defined by:

$$|(X/X_W - Y/Y)| < t_X(Y);\ \text{and}$$

$$|(Z/Z_W - Y/Y)| < t_Z(Y);\ \text{wherein}$$

$t_X(Y)$ and $t_Z(Y)$ define the first and second tolerance data values corresponding to a value of the first color component.

5. The method for gray extraction of claim 4 further comprising calculating the first and second tolerance data values as functionally related to the first color component.

6. The method for gray extraction of claim 4 further comprising outputting, from an associated lookup table, selected first and second tolerance data values corresponding to a value of the first color component.

7. A computer-implemented method for gray extraction on a multicolor document output device operating on a processing device having instructions stored in an associated computer-readable memory and operable on an associated processor, the computer-implemented method comprising:

receiving substantially non-linear, device independent color data having at least three color components, corresponding to an associated electronic document;

calculating a first difference value between a first color component of the at least three color components and a second color component of the at least three color components;

calculating a second difference value between the first color component of the at least three color components and a third color component of the at least three color components;

receiving first tolerance data values representative of a selected range of the device independent color data corresponding to gray coloration associated with the calculated first difference value;

receiving second tolerance data values representative of a selected range of the device independent color data corresponding to gray coloration associated with the calculated second difference value; and generating single color gray data from the color data in accordance with the first and second difference values and the first and second tolerance data values wherein the first color component is represented by a tristimulus value Y, the second color component is represented by a tristimulus value X, the third color component is represented by a tristimulus value Z, and wherein the step of generating single gray data includes the step of generating the single color gray data in a selected range defined by:

$$|(X/X_W - Y/Y)| < t_X(Y);\ \text{and}$$

$$|(Z/Z_W - Y/Y)| < t_Z(Y);\ \text{wherein}$$

$t_X(Y)$ and $t_Z(Y)$ define the first and second tolerance data values corresponding to a value of the first color component.

8. The computer-implemented method for gray extraction of claim 7 further comprising calculating the first and second tolerance data values as functionally related to the first color component.

9. The computer-implemented method for gray extraction of claim 7 further comprising of outputting, from an associated lookup table, selected first and second tolerance data values corresponding to a value of the first color component.

* * * * *